Nov. 8, 1966  D. L. ENSLEY  3,283,589
FORCE RESTRAINED ACCELEROMETER
Filed July 29, 1963  3 Sheets-Sheet 1

3,283,589
FORCE RESTRAINED ACCELEROMETER
Donald Luther Ensley, Hurst, Tex., assignor, by direct and mesne assignments, to Harvest Queen Mill & Elevator Company, Dallas, Tex., a corporation of Texas
Filed July 29, 1963, Ser. No. 298,147
8 Claims. (Cl. 73—516)

This application is a continuation-in-part of application Serial No. 113,546, filed May 29, 1961, now Patent No. 3,164,022 which in turn is a continuation-in-part of application Serial No. 778,673, filed December 8, 1958, now abandoned.

This invention relates to an accelerometer in which a reference element is slightly buoyant in an acoustically transmissive medium and which is resiliently positioned in an acceleration-dependent acoustic field.

As is well known, a body having a mass distribution will not rotate nor translate unless acted upon by net torques or forces. If such net forces or torques exist, the body reacts according to Newton's laws of motion. In many inertial reference systems, such as the gyroscope wheel, the inertia of the body is enhanced by rotation. However, more dynamic errors often are introduced by endeavoring to generate angular momentum than by not doing so. In addition to reducing the net torque, it is desirable to achieve an ultra-low torque suspension system in a relatively simple way. It is an object of the present invention to provide an ultrasonic linear accelerometer which is a spin-free reference system of reduced complexity and with a minimum of moving parts.

It is a further object of the invention to provide a support system which makes use, in a flotation unit, of mechanical radiation pressure gradients which are three-dimensionally inherently stable. It is a further object of the invention to provide a reference element supported by an ultrasonic field which is included in an optically actuated servo system to prevent the viscous coupling from reaching the element. A known differential density is maintained between the reference element and the flotation liquid. The field system preferably is modulated in order to form a closed loop forced balance.

In accordance with an embodiment of the invention, an accelerometer is provided in which an inertial reference element having diametrically opposed curved surfaces is housed in a flotation chamber unit. The unit is filled with a flotation fluid having a specific gravity diffrent than the specific gravity of the element so that the element is slightly buoyant. Transducers generate ultrasonic fields in the flotation fluid resiliently to restrain the element at a reference position in the flotation chamber. Pick-off means generate a signal proportional to displacements along a selected axis of the flotation chamber unit with reference to the element. Means are provided for modulating the transducers in response to the pick-off signal for producing pressure differentials across the element to oppose the acceleration-dependent forces.

For a more complete understanding of the present invention and for further objects and advantages thereof, reference may now be had to the following description taken in conjunction with the accompanying drawings in which.

Figure 1:
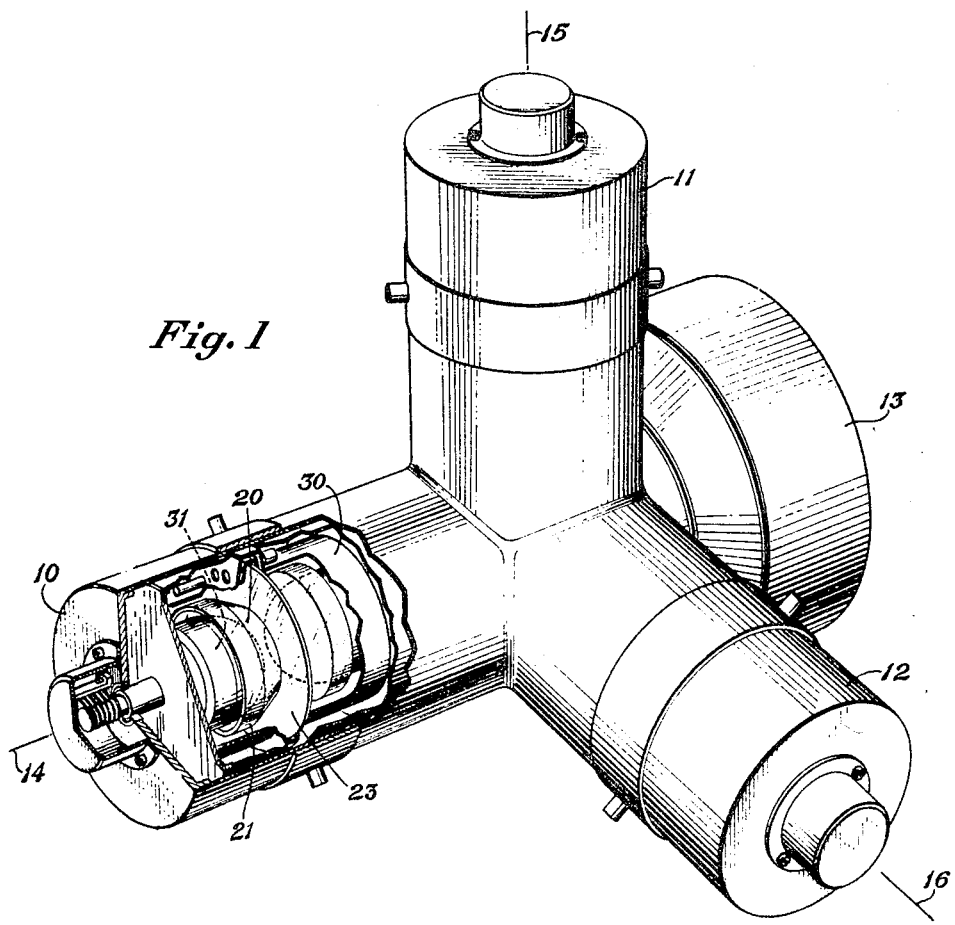
FIGURE 1 is a perspective view of a three-coordinate sensor system.

Referring now to FIGURE 1, there is illustrated a three-coordinate acceleration sensing system in which three cylindrical cases 10, 11 and 12 are mounted on a base 13. The axes 14, 15 and 16 are mutually perpendicular. The base 13 is provided for mounting the sensing system on a moving body, the orientation of which is to be determined and/or controlled.

The system includes three ultrasonic field-supported inertial elements only one of which, the element 20, is shown. An electronic system is employed which includes means for acoustic field excitation and for inertial element position sensing and control.

More particularly, in each of the cases 10–12 a separate inertial element is suspended to provide a reference for acceleration of each case along the axes 14–16. More particularly, a quartz inertial element 20 is suspended in a chamber unit 30. The inertial element 20, in the form shown, includes a thin central disk 23 with cylindrical ends 21 and 22 whose axes correspond with the axis of the disk 23. The end 21 faces the left end of the chamber 30. End 22 faces the right end of the chamber 30. The ends 21 and 22 each have a conical portion where they join with the central disk 23. Ends 21 and 22 are spherically concave. Ends 21 and 22 encompass hemispherical ultrasonic transducers 31 and 32, respectively. Transducers 31 and 32 are piezoelectric shells. They are excited by alternating current for the generation of ultrasonic fields within the chamber 30.

The space in chamber 30 not occupied by element 20 and transducers 31 and 32 is filled with an acoustically transmissive flotation liquid which is slightly compressible and which has a specific gravity slightly contrasting with the density of the element 20. A suitable flotation fluid may be a mixture of tetrabromo-ethane and m-bromotoluene of such proportions that the specific gravity differs slightly from the specific gravity of the reference element so that the element is either positively or negatively slightly buoyant.

Ultrasonic fields generated by transducers 31 and 32 are radially divergent. The fields react with the curved surfaces in the ends of element 20 such that the standing waves are produced in the liquid. The resultant forces on element 20 are such that the element 20 will be resiliently restrained at a reference position.

Identical means are provided in each of housings 11 and 12 so that the character of the acceleration of the base 13 is fully defined by three signals to be generated.

Chamber 30 preferably is a stainless steel closed cylinder. Heater and temperature sensor windings, not shown, are wound and potted on the external periphery of the chamber 30 for temperature control. The inertial element 20 is floated in low viscosity fluid and is supported on an ultrasonic field produced by the transducers 31 and 32. No mechanical connection is made between the chamber 30 and the inertial element 20 except the direct contact with the flotation fluid. In operation, heater windings maintain the entire chamber at constant temperature and expansion bellows, not shown, permit freedom for fluid expansion.

The operation of the system is based primarily upon the flotation of the inertial element 20 in the chamber 30 and the generation of a time average radiation pressure. It may readily be shown that the first order propagation equation for excitation of the transducers 31 and 32 is as follows:

$$C^2(^2\nabla\phi) - \frac{\partial^2\phi}{\partial t^2} = 0 \text{ (Linear Response)} \qquad (1)$$

where:
C is the phase velocity of the sound generated by the transducers 31 and 32;

$\phi$ is the velocity potential of the sound field;

$$\frac{\partial^2}{\partial t^2}$$

is the second derivative with respect to time, and
$\nabla$ is the differential operator.

The second order propagation may be shown to correspond with the following expression:

$$C^2(\nabla^2\phi) - \frac{\partial^2\phi}{\partial t^2} + \frac{\partial}{\partial t}(\nabla\phi)^2 - (n-1)\frac{\partial\phi}{\partial t}\nabla^2\phi = 0 \quad (2)$$

where:
$n$ is the power in the polytropic relationship between pressure and density $$\frac{P}{P_0} = \left(\frac{\rho}{\rho_0}\right)^n$$

with $P_0$ and $\rho_0$ being undisturbed pressure and density and $P$ and $\rho$ being reference pressure and density.

From Equation 2, it can be shown that the time average radiation pressure $Pa$ is expressed by the following relationship:

$$Pa = \frac{\rho 0}{2}\left[\frac{1}{C^2}\overline{\left(\frac{\partial\phi}{\partial t}\right)^2} - \overline{(\nabla\phi)^2}\right] \quad (3)$$

where:
$\rho_0$ is the density of the undisturbed fluid in which the sound field is generated.

A solution of Equation 3 gives rise to pressure standing waves in the fluid in chamber 30. The system is so constructed that the boundary conditions which are present maximize the standing wave amplitude. As a result, a stable resilient suspension is provided which is characterized by the absence of coulumb friction.

Figure 2:
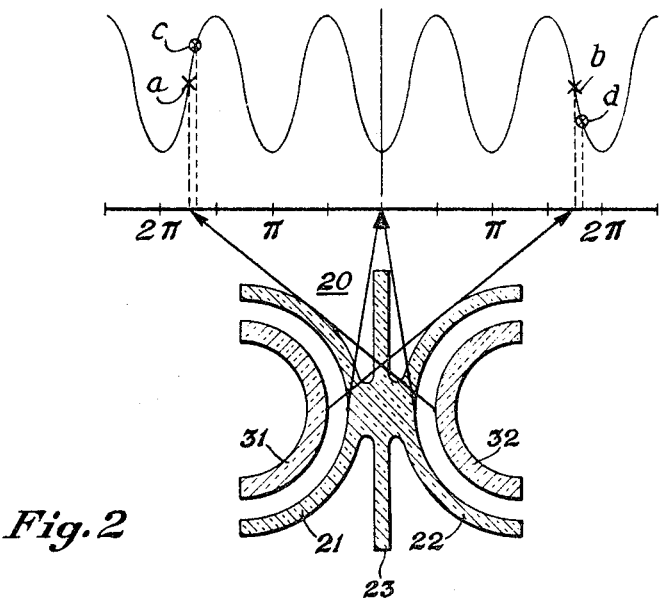
FIGURE 2 is a diagrammatic representation of the support for an inertial element.

FIGURE 2 is explanatory of the suspension under control of ultrasonic sine wave excitation. In FIGURE 2 the element 20 has been shown in its normal relationship with respect to the transducers 31 and 32. FIGURE 2 also includes, on an expanded scale, a representation of pressure standing waves in the fluid. The zero reference ordinate corresponds with the surfaces of the transducers 31 and 32. Distance to the right represents separation from the face of cylinder 21. Distance to the left represents separation from the face of cylinder 22. When the element 20 is positioned symmetrically in the pressure field, the inner faces of the element 20 are at positions of equal pressure as represented by points $a$ and $b$. However, if the element 20 moves to the left in response to a given acceleration in the direction of axis 14 relative to transducers 31 and 32, the surface of end 21 is closer to the surface of transducer 31 and thus is at a higher pressure potential as represented by point $c$. At the same time, the surface of the end 22 is at a lower pressure potential as represented by point $d$. As a result, the element 20 is moved back to its equilibrium position where the pressure at the surfaces of ends 21 and 22 are equal. Since the forces are in opposition, the element 20 is maintained at a reference position.

Since the transducers 31 and 32 are hemispheres and since the concave ends 21 and 22 are symmetrical with respect to the axis of element 20, the element 20 is restrained by the same reaction in the two other coordinates corresponding with axes 15 and 16. Thus, the element 20 is resiliently supported by the second order time average radiation pressure existing in the fluid in chamber 30.

Figure 3:
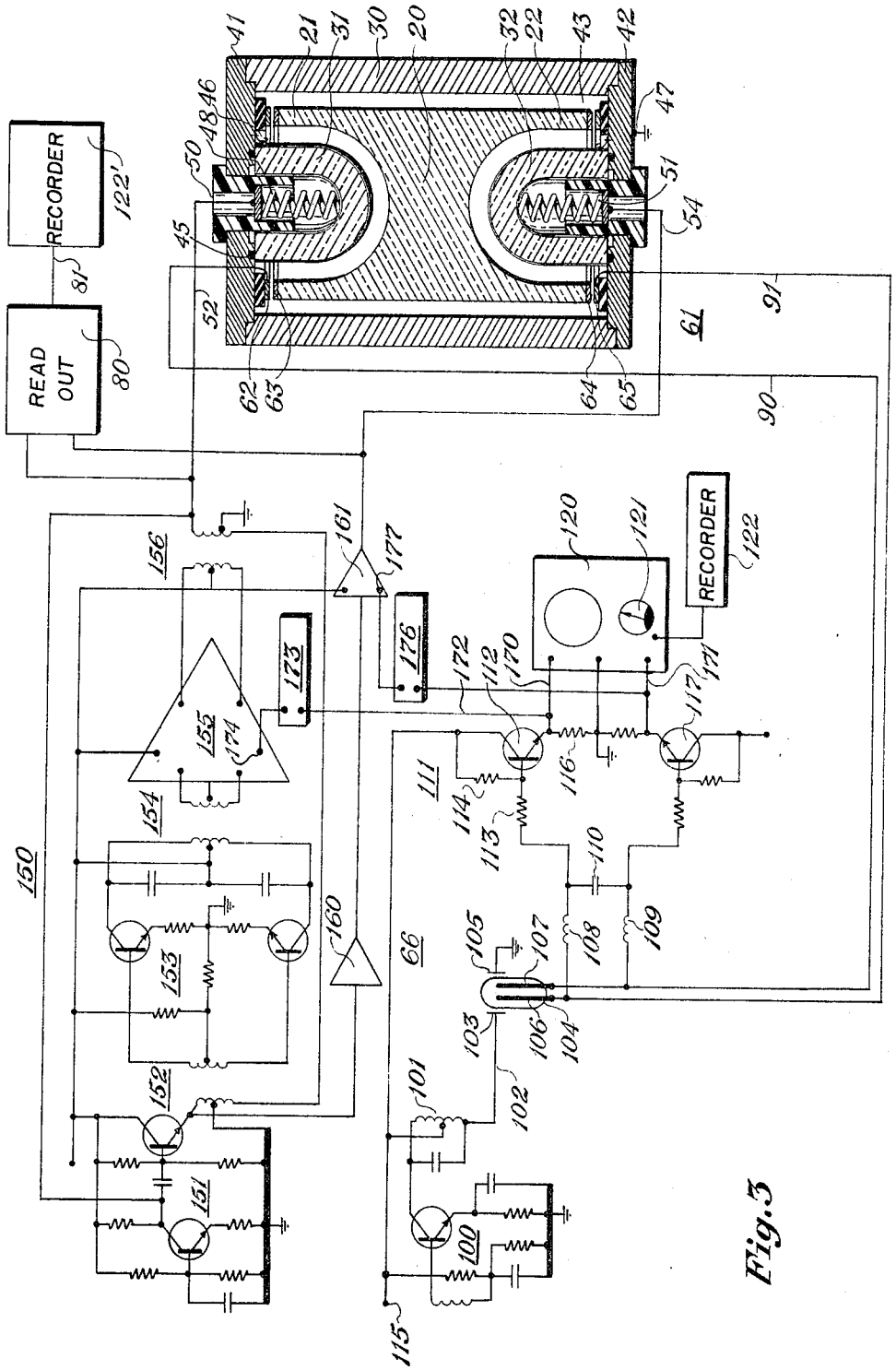
FIGURE 3 illustrates one embodiment of the present invention.
Figure 4:
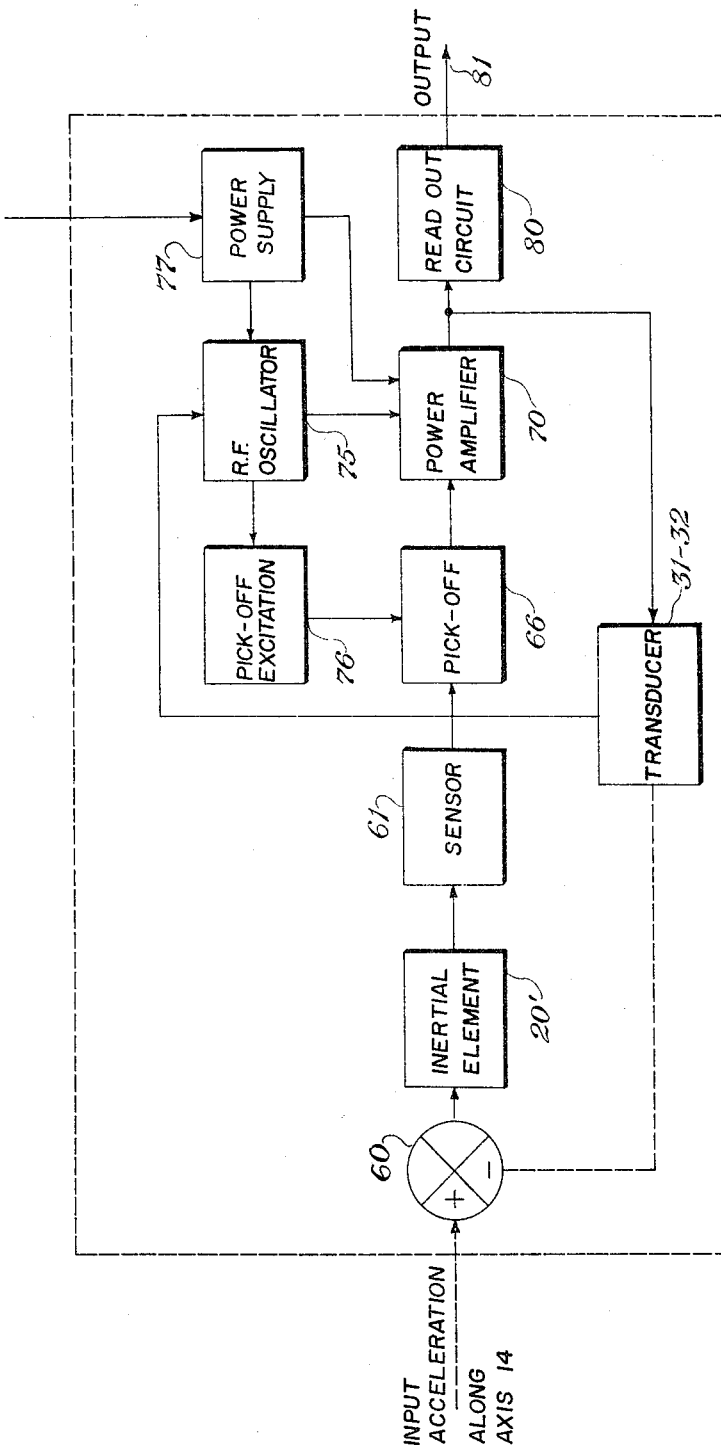
FIGURE 4 is a block diagram for closed loop forced balance operation of the system of FIGURE 3.

FIGURES 3 and 4 illustrate in further detail one embodiment of the invention with certain structural features of the unit in simplified form. Housing 30 is cylindrical in form and is closed at the ends thereof by end plates 41 and 42. The housing is liquid-tight and includes the flotation liquid in the space 43. The reference element 20 is positioned in the housing and is shown in simplified cylindrical form. The ends 21 and 22 of the element 20 are hemispherically concave.

End plate 41 has the transducer 31 secured thereto with the axis thereof corresponding with the axis of the housing 30. The transducer 31 is a piezoelectric crystal having an inner conductive film and an outer conductive film. The transducer 31 is adhesively secured to the end plate 41 as by an adhesive ring 45. The outer film of transducer 31 is maintained electrically at the same potential as the housing 30 by a resilient contact 46. The housing 30 is connected to ground at point 47.

The inner film on transducer 31 is not connected to the end plate 41 and is the high potential terminal for the transducer 31. An electrical contact is established to the inner film by a spring 48 which is seated in an insulating insert 50 which is threaded into plate 41. A conductor 52 is connected to the spring 48 to provide a circuit leading from transducer 31.

An identical construction is provided for a circuit leading to the second transducer 32 which is secured to the end plate 42. Spring 51 is connected to the conductive film on the inner surface of the crystal 32. Conductor 54 leads from spring 51.

With the unit 20 suspended, as illustrated in FIGURE 3, and with a known differential density maintained between the element 20 and the liquid in which it is immersed, the acoustic field generated by transducers 31 and 32 preferably is modulated in order to form a closed loop forced balance accelerometer. Acceleration along the axis 14 tends to move the housing 30 relative to the element 20. Such movement produces variation in a capacitance with a resultant signal being employed to control the excitation of the transducers 31 and 32. In the embodiment shown in FIGURE 3, acceleration forces along axis 14 are employed in a closed loop to regulate the pulse repetition frequency of the voltage applied to transducers 31 and 32. By this means the sensitive axis spring rate is controlled by the time average resonant cavity response. The cavity within housing 30 is a low acoustic energy loss cavity. It is hit periodically by excitation of transducers 31 and 32. The acoustic fields are allowed to decay to a certain percentage of their values. The cavity is then pulsed again. The time averages of this process is controlled by the pulse repetition frequency. Since the actual spring rate depends upon the square of the time variable pressure within the housing 31, the spring rate also depends linearly upon the power applied thereto. Since the power is controllable, after taking into account the decay properties of the housing 30, by the pulse repetition frequency, the pulse repetition frequency may then be utilized as a direct measure for the acceleration.

The accelerometer transducers operate at 10 megacycles per second. A dynamic range of about two million is achievable. By this means a range of from $5 \times 10^{-6}$ "g" to 10 "g" with one accelerometer becomes feasible.

FIGURE 4 is a block diagram illustrating the closed loop forced balance operation. For critical application where a system requires accurate acceleration measurements down to $1 \times 10^{-8}$ "g" the closed loop forced balance operation is used in order to avoid non-linearity present in the pressure field at points displaced from equilibrium.

The closed loop power is measured in terms of pulse repetition frequency which is linear with acceleration. As indicated in FIGURE 4, a closed loop forced balance operation is such that the transducers 31 and 32 apply a reactive force to the inertial element 20' in opposition to the acceleration forces which are effective on the inertial element 20' as represented by the combining action of such forces at a summing unit 60. The application of input acceleration forces along axis 14 produces an output from the sensor unit 61, which is detected at a pick-off unit 66, the output of which is applied to a power amplifier 70. A radio frequency oscillator 75 serves to excite the power amplifier 70 and to provide excitation for the pick-off through unit 76. A D.C. power supply 77 is provided for the entire system. A readout unit 80 is connected to the output of the power amplifier to provide a signal on channel 81, which is representative of acceleration.

The system shown in block form in FIGURE 4 has been provided in more detail in FIGURE 3. The sensor 61 is comprised of a first pair of capacitive plates 62 and 63 and a second pair of capacitive plates 64 and 65. Plate 62 is mounted on an insulating ring on the end of plate 41. Ring 63 is mounted on the end of the unit element 20. Similarly, ring 64 is mounted on the opposite end of element 20 and ring 65 is mounted on an insulating ring on the end plate 42. With the housing 30 maintained at ground potential, movement of the housing upward relative to element 20 will cause the spacing between rings 62 and 63 to increase and the spacing between rings 64 and 65 to decrease. The electrical capacitances formed by rings 62, 63 and 64, 65 are relatively small in magnitude. They may be considered to be connected in series with the large condenser, one plate of which comprises the walls of the unit 20 and the inner walls of the housing 30. Thus, a signal is generated on conductors 90 and 91, which is proportional in magnitude to the magnitude of the acceleration with the phase thereof depending upon the direction of the acceleration. The conductors 90 and 91 lead to the pick-off system 66.

The pick-off circuit 66 is a highly sensitive system capable of translating relatively small changes in capacity as between rings 62–65 into a voltage which is repressentitive of the movement of the housing 30 along the axis 14. More particularly, the measuring system 66 includes an oscillator 100 which has an output coil 101. Coil 101 is connected by way of conductor 102 to a plate 103 which is adjacent to the envelope of a gas tube 104. A second plate 105, positioned on the side of the tube 104 opposite the plate 103, is connected to ground. The tube 104 includes a pair of electrodes 106 and 107 which extend into a gaseous atmosphere maintained within the envelope. The conductors 90 and 91 are connected directly to the electrodes 106 and 107, respectively.

In one embodiment of the invention, the tube 104 was in the form of a glass envelope of about one-half inch in length and one-fourth inch in diameter. The electrodes 106 and 107 were tungsten rods of about one thirty-second of an inch in diameter. Electrodes 106 and 107 extended into the tube 104 about three-eighths of an inch and had a separation between the adjacent surfaces thereof of about 4 millimeters. The envelope was evacuated and then loaded with xenon gas at a pressure of about one-half millimeter at room temperature. Operation has been found to be satisfactory with xenon gas pressures up to about one and one-half millimeters as well as somewhat lower levels. Other inert gases such as neon, argon, or helium are suitable but best results have been experienced with xenon.

Electrodes 106 and 107 are also connected by way of a filter device including coils 108 and 109 and a capacitor 110 to the input on an amplifier 111 to eliminate signals from oscillator 100. The amplifier 111 includes a first transistor 112 connected at the base to a resistor 113 which leads to one terminal of coil 108. The base also is connected by way of resistor 114 to the collector electrode which in turn is connected to a B+ terminal 115. The collector electrode is connected by way of a resistor 116 to ground.

The circuit for the other stage of amplifier 111 comprising the transistor 117 is identical to the circuit for transistor 112. A push-pull output circuit is provided which may be applied to a suitable measuring system including the oscilloscope 120 on which the variations in capacity produced by acceleration in the system may appear as a deflection of the cathode-ray beam. The system also includes a meter 121 to provide a direct or numerical measure of the acceleration. A recorder 122 is also included to provide a continuous record of the time variations in acceleration.

In order to realize the advantage of the precision suspension of the system in housing 30, an extremely sensitive and stable displacement device is required. In this connection it should be remembered that displacements of the order of fractional micro-inches are to be detected. The use of the tube 104 excited as above described permits the production of a usable voltage which is not dependent upon high electronic amplification although in some ranges a more conventional amplifying system might be adequate. The gas tube 104 is characterized by nonlinear ionization when excited by a radio frequency signal. The oscillator 100 is adapted to produce an ionizing voltage at a frequency of the order of several megacycles. This voltage is applied to the plasma within tube 104 as an electrostatic field by applying the R.F. voltage to the plates 103 and 105. The variations in capacitance between the rings 62–65 serve to vary the effective capacity across the electrodes 106 and 107 so that a D.C. voltage, which is linear with very small values in capacitance change, will appear across the electrodes 106 and 107.

In order to drive transducers 31 and 32, a pair of driving channels are provided. The first channel 150 is fed from an oscillator 151 at a frequency of the order of ten megacycles per second. The output of oscillator 151 is transmitted by way of coupling transformer 152 to a push-pull amplifier 153. The output of amplifier 153 is applied by way of transformer 154 to a power amplifier 155. The output of amplifier 155 is applied by way of transformer 156 to a circuit including conductor 52 and ground, which serves to excite the transducer 31. An identical circuit is fed from oscillator 151, including amplifiers 160 and 161, for exciting transducer 32. While oscillator 151 has been shown separately, it may be synchronized with oscillator 100, or, alternatively, oscillator 100 may be employed not only to excite the pick-off unit 104 but also to excite both of the amplifier circuits 150 and 160, 161. In a closed loop forced balance system, the voltages appearing on the output terminals 170 and 171 of the amplifier 111 are employed to control the power applied to the transducers 31 and 32 from amplifiers 155 and 161, respectively. More particularly, a conductor 172 connects terminal 170 to the input of a control unit 173. The output of control unit 173 is connected to the control input terminal 174 of the amplifier 155. A control unit 176 is connected to output terminal 171 and, in turn, is connected to the control input terminal 177 of amplifier 161. Control units 173 and 176 serve to control transmission of power through amplifiers 155 and 161 in dependence upon the signal appearing at terminals 170 and 171. Preferably, the units 173 and 176 will serve to modulate the power delivered by amplifiers 155 and 161 by gating the amplifiers 155 and 161 "on" for periods of time which are dependent upon the signals detected by the sensor unit 62–65. Normally, the amplifiers 155 and 161 will be turned on for equal periods of time such as to establish second order radiation fields in the fluid in housing 30 to restrain the element 20 at a normal or quiescent position in the housing 30. Upon acceleration, the signal voltage across the terminals 170 and 171 will change. This change is employed to cause the power from amplifiers 155 and 161 to excite transducers 31 and 32 at pulse rates which differ. By this means the time average of the pressure effective at opposite ends of the element 20 is controlled by the pulse repetition frequency of the amplifiers 155 and 161. Since the actual spring rate is dependent upon the square of the alternating pressure produced by the application of the radio frequency pulses to transducers 31 and 32, the spring rate also depends linearly upon driving power. The power is thus controllable by units 173 and 176. The pulse repetition rate is thus proportional to acceleration and may be employed as a measure of acceleration. The readout unit 80, as illustrated, is connected to the output conductors 52 and 54 to develop an output signal on channel 81, which may then be applied to a recorder 122'.

Having described the invention in connection with certain specific embodiments thereof, it is to be understood that further modifications may now suggest themselves to those skilled in the art and it is intended to cover such modifications as fall within the scope of the appended claims.

What is claimed is:

1. An accelerometer which comprises:
   (a) an inertial reference element of cylindrical form having concave ends,
   (b) a flotation chamber unit for encasing said element and filled with a flotation liquid having a specific gravity contrasting with the specific gravity of said element,
   (c) a pair of acoustic transducers extending from opposite ends of said chamber unit into juxtaposition with the concave ends of said element for generation, upon excitation thereof, of opposed radially divergent ultrasonic fields resiliently to restrain said element at a reference position in said chamber unit in response to second order pressure fields produced by reaction of the fields with said concave ends, and
   (d) capacitance means at the ends of said element and said unit for sensing variations in the position of said unit with reference to said element along an axis to which said concave ends are symmetrical.

2. An accelerometer which comprises:
   (a) an inertial reference element of cylindrical form having hemispherically concave ends,
   (b) a flotation chamber unit for encasing said element and filled with a flotation liquid having a specific gravity contrasting with the specific gravity of said element,
   (c) a pair of hemispherical acoustic transducers extending from opposite ends of said chamber unit into the concave ends of said element for generation, upon excitation thereof, of opposed radially divergent acoustic fields resiliently to restrain said element at a reference position in said chamber unit in response to second order pressure fields produced by reaction of the fields with said concave ends, and
   (d) capacitance means at the ends of said element and said unit for sensing variations in the position of said unit with reference to said element along an axis symmetrical to said concave ends.

3. An accelerometer which comprises:
   (a) an inertial reference element of cylindrical form having concave ends,
   (b) a flotation chamber unit for encasing said element and filled with a flotation liquid having a specific gravity contrasting with the specific gravity of said element,
   (c) a pair of acoustic transducers extending from opposite ends of said chamber unit into juxtaposition with the concave ends of said element for generation, upon excitation thereof, of opposed radially divergent ultrasonic fields resiliently to restrain said element at a reference position in said chamber unit in response to second order pressure fields produced by reaction of the fields with said concave ends,
   (d) capacitance means at the ends of said element and said unit for sensing variations in the position of said unit with reference to said element along an axis to which said concave ends are symmetrical, and
   (e) acoustic field control means connected between said capacitance means and said transducers for separately modulating the acoustic fields at the ends of said chamber unit to control the effective spring constant of the acoustic suspension in dependence upon acceleration dependent forces.

4. An accelerometer which comprises:
   (a) an inertial reference element having diametrically opposed curved indentations,
   (b) a fluid filled flotation chamber unit for enclosing said element in a flotation fluid which has a specific gravity different from the specific gravity of said element whereby said element is slightly buoyant,
   (c) source means extending into said indentations for generating ultrasonic fields directed to the surfaces of said indentations resiliently to restrain said element at a reference position in said flotation chamber unit,
   (d) pick-off means for sensing displacements along a selected axis of said unit relative to said inertial element, and
   (e) means for modulating said source means in response to said pick-off means for producing pressure differentials across said inertial element in opposition to acceleration dependent forces.

5. An accelerometer which comprises:
   (a) a hollow body filled with a flotation fluid,
   (b) a reference element having oppositely facing concave surfaces slightly buoyant in said fluid,
   (c) driving means including an ultrasonic energy source for propagation of directionally opposed ultrasonic fields in said flotation fluid for reaction with said concave surfaces resiliently to restrain said element at a reference position in said body, and
   (d) circuit means responsive to positional changes of said body with reference to said element for pulse time modulating said driving means differentially to alter said fields for dynamic changes in the effective spring constants of the fields in said fluid to maintain said element at a fixed position relative to said body.

6. An accelerometer which comprises:
   (a) a hollow body filled with a flotation fluid,
   (b) a reference element having opposed concave surfaces slightly buoyant in said fluid,
   (c) driving means including an ultrasonic energy source for propagation of directionally opposed ultrasonic fields in said flotation fluid for reaction with said concave surfaces resiliently to restrain said element at a reference position in said body,
   (d) circuit means responsive to positional changes of said body with reference to said element for pulse time modulating said driving means differentially to alter said fields for dynamic changes in the effective spring constants of the fields in said fluid to maintain said element at a fixed position relative to said body, and
   (e) means for measuring the power delivered by said driving means.

7. The method of detecting acceleration of a body which comprises:
   (a) floating an inertial reference element in a flotation fluid in said body,
   (b) propagating pulse time modulated ultrasonic pressure fields from opposite directions within said body for reaction with opposed faces of said reference element resiliently to restrain said reference element at a reference position, and
   (c) measuring a function representative of the power required in said fields to restrain said element at said reference position.

8. The method of detecting acceleration of a body which comprises:
   (a) floating a slightly buoyant inertial reference element in a flotation fluid in said body,
   (b) propagating pulse time modulated ultrasonic pressure fields from opposite directions within said body for reaction which hollowed opposed faces of said reference element resiliently to restrain said reference element at a reference position, and
(c) varying the modulation of said fields in dependence upon positional variations of said body relative to said element, and
(d) measuring a function representation of the power required in said fields to slave said element to said body.

References Cited by the Examiner

UNITED STATES PATENTS

| | | | |
|---|---|---|---|
| 3,003,356 | 9/1961 | Nordsieck | 73—517 |
| 3,124,962 | 3/1964 | Hirtreiter | 73—516 |

RICHARD C. QUEISSER, *Primary Examiner.*

JAMES J. GILL, *Examiner.*

UNITED STATES PATENT OFFICE
CERTIFICATE OF CORRECTION

Patent No. 3,283,589                                   November 8, 1966

Donald Luther Ensley

It is hereby certified that error appears in the above numbered patent requiring correction and that the said Letters Patent should read as corrected below.

Column 1, line 42, for "look" read -- loop --; line 48, for "diffrent" read -- different --; column 2, line 67 for that portion of the equation reading $$^2\nabla\phi \qquad \text{read} \qquad \nabla^2\phi$$

column 5, lines 30 and 31, for "representitive" read -- representative --; column 8, line 75, for "which" read -- with --; column 9, line 6, for "representation" read -- representative --.

Signed and sealed this 13th day of August 1968.

(SEAL)
Attest:

Edward M. Fletcher, Jr.                          EDWARD J. BRENNER

Attesting Officer                                     Commissioner of Patents